(12) United States Patent
McCann (10) Patent No.: US 10,445,847 B2
(45) Date of Patent: Oct. 15, 2019

(54) NOISE COMPLAINT REPORTING SYSTEM

(71) Applicant: Christopher McCann, La Jolla, CA (US)

(72) Inventor: Christopher McCann, La Jolla, CA (US)

(*) Notice: Subject to any disclaimer, the term of this patent is extended or adjusted under 35 U.S.C. 154(b) by 0 days.

(21) Appl. No.: 16/231,068

(22) Filed: Dec. 21, 2018

(65) Prior Publication Data

US 2019/0147556 A1 May 16, 2019

Related U.S. Application Data

(60) Provisional application No. 62/644,327, filed on Mar. 16, 2018.

(51) Int. Cl.
| | |
|---|---|
| *G06Q 50/26* | (2012.01) |
| *G08G 5/00* | (2006.01) |
| *H04R 29/00* | (2006.01) |
| *G10L 25/51* | (2013.01) |

(52) U.S. Cl.
CPC ......... *G06Q 50/26* (2013.01); *G08G 5/0095* (2013.01); *G10L 25/51* (2013.01); *H04R 29/00* (2013.01)

(58) Field of Classification Search
CPC .................. H04R 29/00; G10L 25/51
See application file for complete search history.

(56) References Cited

U.S. PATENT DOCUMENTS

| | | | |
|---|---|---|---|
| 2006/0191326 A1* | 8/2006 | Smith ................ | G01H 17/00 73/73 |
| 2018/0144762 A1* | 5/2018 | Guerrieri .............. | H04L 67/125 |

OTHER PUBLICATIONS

Airnoise ("Make your Voice Heard over the Roar"), Aug. 18, 2018 https://airnoise.io/Wayback Machine: https://web.archive.org/web/20180815000000*/https://airnoise.io/ (Year: 2018).*
International Search Report and Written Opinion issued in PCT/US2019/021015, dated Apr. 12, 2019, 11 pages.
"Jet noise getting you down?" retrieved from https://airnoise.io/, website published Mar. 25, 2017 (1 page).

* cited by examiner

*Primary Examiner* — Yogeshkumar Patel
(74) *Attorney, Agent, or Firm* — ARC IP Law, PC; Joseph J. Mayo (57) ABSTRACT

System that enables a user to generate a detailed noise complaint with a simple input such as a button click; the system identifies the source of the noise and the authority responsible for monitoring this noise, and it creates a properly formatted complaint and sends it to the responsible authority. Illustrative uses include generation of complaints for noise caused by air traffic, trains, wind turbines, road traffic, or sirens. The user may initiate a complaint using any device such as a mobile phone, a voice-activated system such as Amazon Echo™ or Google Home™, or a dedicated input device. The system may search databases or information feeds to identify the likely source of noise near the user's location. For example, the system may access real-time flight path data to find the airplane closest to the user at the time the user initiates an air noise complaint.

16 Claims, 6 Drawing Sheets

NOISE COMPLAINT REPORTING SYSTEM

This patent application claims the benefit of U.S. Provisional Patent Application Ser. No. 62/644,327 filed 16 Mar. 2018, the specification of which is hereby incorporated herein by reference.

BACKGROUND OF THE INVENTION

Field of the Invention

One or more embodiments of the invention are related to the fields of noise tracking and noise reporting. More particularly, but not by way of limitation, one or more embodiments of the invention enable a noise complaint reporting system.

Description of the Related Art

Undesirable noise from various sources is an increasing problem in society. Examples include noise from airplanes, trains, and automobiles. As an example, air traffic noise is an increasing problem due to expanding numbers of flights, closer routing of flights to population centers, and population growth near airports and flight paths. While mechanisms exist for members of the public to file complaints on excessive noise, these mechanisms are generally cumbersome and time-consuming; as a result, complaints are not often filed, and authorities have an incomplete view of the impact of noise on the public. A simple mechanism for a person to file a complaint, for example with a single button click, does not exist.

For at least the limitations described above, there is a need for a noise complaint reporting system.

BRIEF SUMMARY OF THE INVENTION

One or more embodiments described in the specification are related to an noise complaint reporting system. Embodiments of the system may provide a simple method for a user to generate and submit a real-time, detailed complaint for undesirable noise, and to submit this complaint automatically to the appropriate authorities.

One or more embodiments of the invention may include an input device that a user uses to initiate a complaint about an undesirable noise, a noise source identification engine that finds the source of the noise, a responsible authority identification engine that determines which authority is responsible for monitoring or responding to the noise, and a complaint generation engine that creates a complaint in the appropriate format for the responsible authority and transmits to this authority. The input device may have one or more input controls, such as buttons for example, each of which corresponds to a type of undesirable noise that the user may experience and may wish to report. When the user activates an input control, the input device may generate a message with the date and time, the type of undesirable noise corresponding to the input control, and the location of the input device. The noise source identification engine may receive this message and correlate the location, the date and time, or both with one or more databases to identify a source of the undesirable noise. The responsible authority identification engine may determine which authority is responsible for this particular noise source. The complaint generation engine may obtain the required complaint format associated with this responsible authority, generate a complaint in this format, and forward it to the authority. The complaint may contain for example the user's identity, the location, the date and time, and the noise source.

Embodiments may use any type of input device to obtain input from the user to initiate a noise complaint. One or more embodiments may use a device with physical buttons or switches as input controls. One or more embodiments may use a device with a processor and a screen, such as a mobile phone for example, and the input controls may correspond to options on the screen presented by an application running on the device's processor. In addition to mobile phones or smartphones, input devices may include for example a smart watch, smart glasses, a tablet, a laptop, a notebook, a desktop, and a server. Input devices may have a microphone and may use voice-activated input controls; for example, an Amazon Echo™ or Google Home™ device may be used for input.

In one or more embodiments, the location associated with the message from the input device may be obtained from a GPS or other sensor included in or coupled to the input device. Alternatively, or in addition, the location of the input device may be configured and stored in a record that is accessible to one or both of the input device and the noise source identification engine.

Illustrative types of noise that may be reported by one or more embodiments include noise from aircraft, such as airplanes or helicopters, trains, wind turbines, and road traffic. In one or more embodiments the input device may have multiple input controls, each corresponding to a different type of noise; for example, there may be separate input controls for airplane noise and for helicopter noise.

For complaints of air traffic noise, the noise source identification engine may search a database of aircraft flight path information to find an aircraft in the proximity of the user or the input device at the time the user initiates the complaint. The noise source identification engine may also determine the altitude of this aircraft, and compare it to an allowed minimum altitude to determine whether the complaint should also report that the aircraft violated the minimum altitude. The responsible authority identification engine may for example locate the departure or arrival airport associated with the aircraft's flight path, and may identify one or both of these airports as the responsible authority that will receive the noise complaint.

For complaints of road noise, the noise source identification engine may identify an address, a street, a road, a highway, or an intersection where the user experienced undesirable road traffic noise, and this information may be reported to the responsible authority.

The input device may be connected to the other components—the noise source identification engine, the responsible authority identification engine, and the complaint generation engine—using any type of technology or technologies, including either or both of wired and wireless links. In an illustrative embodiment, the input device may be connected with a local WiFi connection to a wireless access point, which is connected over an Internet connection to an Internet server that executes all or part of the noise source identification engine.

BRIEF DESCRIPTION OF THE DRAWINGS

The above and other aspects, features and advantages of the invention will be more apparent from the following more particular description thereof, presented in conjunction with the following drawings wherein:

FIG. 2 shows an embodiment of the system that generates a complaint for train noise;

the user input device is a mobile phone.

DETAILED DESCRIPTION OF THE INVENTION

A noise complaint reporting system now be described. Embodiments of the system may provide a method for a user to generate and submit a real-time, detailed complaint for noise, and to submit this complaint automatically to the appropriate authorities. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 4:
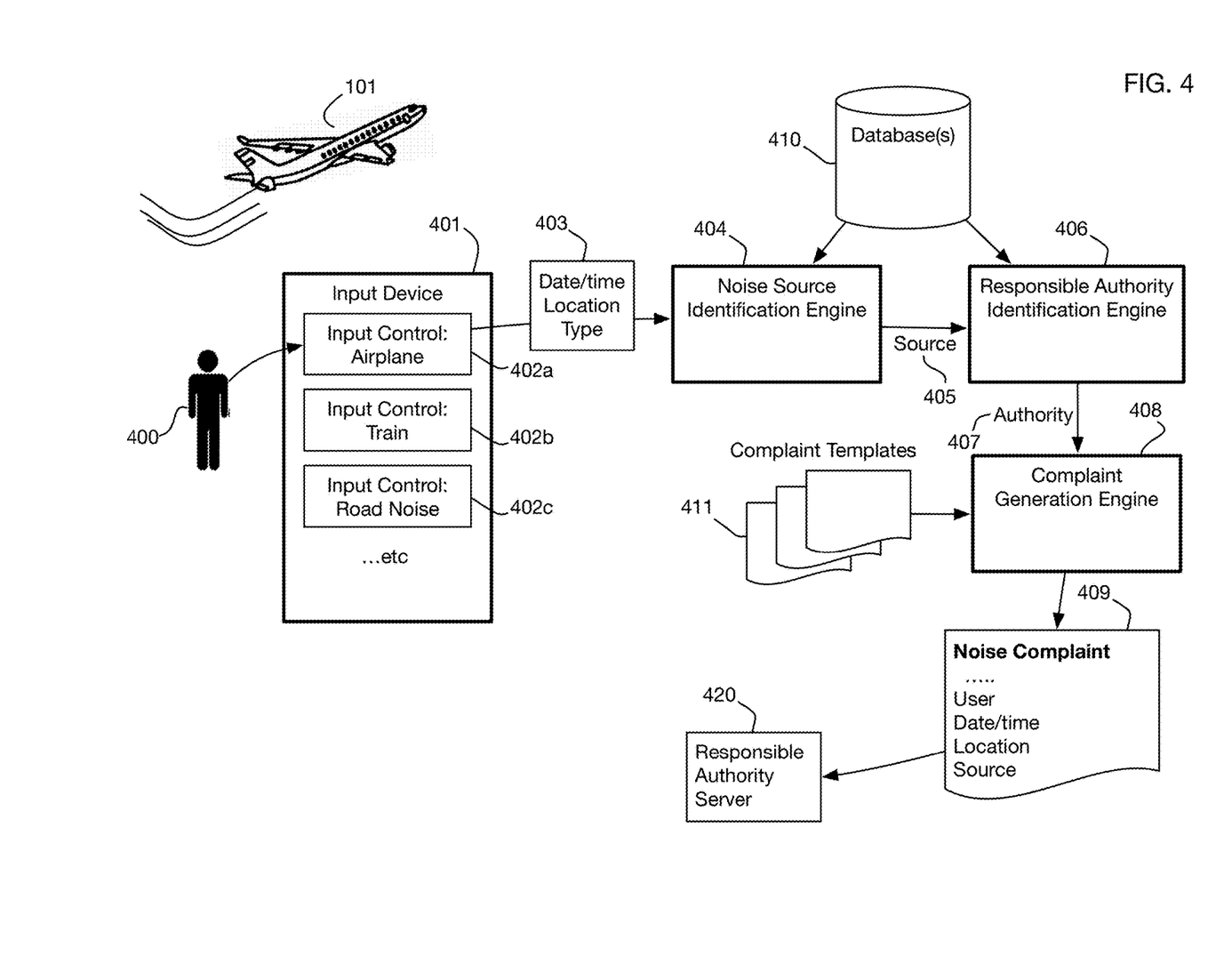
FIG. 4 shows an architectural diagram for one or more embodiments of the system.

FIG. 4 shows an architectural diagram of one or more embodiments of the invention. User 400 experiences an undesirable noise, for example from airplane 101. The user wants to generate a specific complaint about this noise and submit this complaint to the appropriate authority or authorities. User 400 accesses an input device 401 to initiate the complaint process. Input device 401 may be for example a device with physical input controls such as physical buttons or switches, a device with a screen and a processor that presents virtual input controls on the screen, or a device with a microphone that accepts voice commands as input controls. Devices with screens, processors, or microphones that may be used as input devices in one or more embodiments may include for example, without limitation, a mobile phone, a smartphone, a smart watch, smart glasses, a laptop, a notebook, a desktop, a server, or a voice-activated control system such as for example an Amazon Echo™ or Google Home™. In one or more embodiments, device 401 may have multiple input controls, each corresponding to a different type of undesirable noise that the user wishes to report. For example, device 401 has input control 402a to generate a complaint about airplane noise, input control 402b to generate a complaint about train noise, and input control 402c to generate a complaint about road noise. These types of undesirable noise are illustrative; one or more embodiments may have one or more input controls corresponding to any type or types of undesirable noise. Any type or types of input controls may be used, including for example, without limitation, buttons, drop-down lists, checkboxes, radio buttons, text fields, clickable or selectable icons or descriptions, or voice commands.

When user 400 activates an input control, input device 401 generates a message 403 that may contain for example the date and time of the input, the location of the user or input device, and the type of undesirable noise that corresponds to the input control selected by the user. This message may be used by other components of one or more embodiments of the invention to identify the source of the undesirable noise and to report it to the appropriate authority. The location in message 403 may be for example the location of the user or the input device when the user activates the input control. In one or more embodiments, input device 401 may include or may be connected to a location service or sensor such as a GPS. In one or more embodiments, the input device 401 may be in a fixed or semi-fixed location, and this location may be configured and stored for example as a record on the input device or on another system or database. The location in message 403 may be set by the input device, or alternatively the input device may provide a reference or identifier that is used to lookup a stored location by any other component in the system that needs the location.

Message 403 may be used by one or more other components of the system to generate a noise complaint from the user 400 about the undesirable noise the user has experienced. The components may for example include a noise source identification engine 404 that determines the source 405 of the noise, a responsible authority identification engine 406 that determines which authority 407 is responsible for monitoring this noise source, and a complaint generation engine 408 that creates a properly formatted noise complaint 409 and forwards it to the responsible authority server 420. These components 404, 406, and 408 may execute on any processor or processors. They may execute on the same processor or on different processors. They may for example execute as web services. Input device 401 may communicate with these components over any type of connection, including for example local wired or wireless connections, internet connections, or combinations thereof. An illustrative connection architecture may for example connect an input device 401 in a home or office to a local gateway, over a wireless or wired connection, which then connects to the Internet. A mobile input device 401 may for example connect via a cellular network to an Internet connection. In one or more embodiments the input device 401 may also perform one or more of the functions 404, 406, and 408.

Noise source identification engine 404 may for example identify source 405, or one or more potential sources, by correlating any or all of the date/time, location, and type information in message 403 with one or more databases 410 or information services. For example, these databases may indicate which potential noise sources are near the location of the input device at the date and time that user 400 reported the noise. Responsible authority identification engine 406 may also access one or more databases 410 to identify the authority 407 responsible for monitoring or responding to a noise problem for source 405. The authority 407 may be for example a government agency responsible for monitoring particular types of noise, or for monitoring particular locations. Complaint generation engine 408 may access one or more complaint templates 411, which may for example be specific to each responsible authority or to each type of noise. The complaint generation engine 408 may therefore generate a noise complaint 409 in the expected or required format for submission to the responsible authority. The noise complaint 409 may include any relevant information, including for example, without limitation, any or all of the user submitting the complaint, the date and time of the complaint, the location of the complaint, and the source of the noise. This complaint 409 may be sent to a responsible authority server 420, for example as an email or as a form submission. In one or more embodiments the complaint generation engine 408 may print a physical noise complaint 409 that may be mailed or otherwise delivered to the responsible authority 407.

Figure 1:
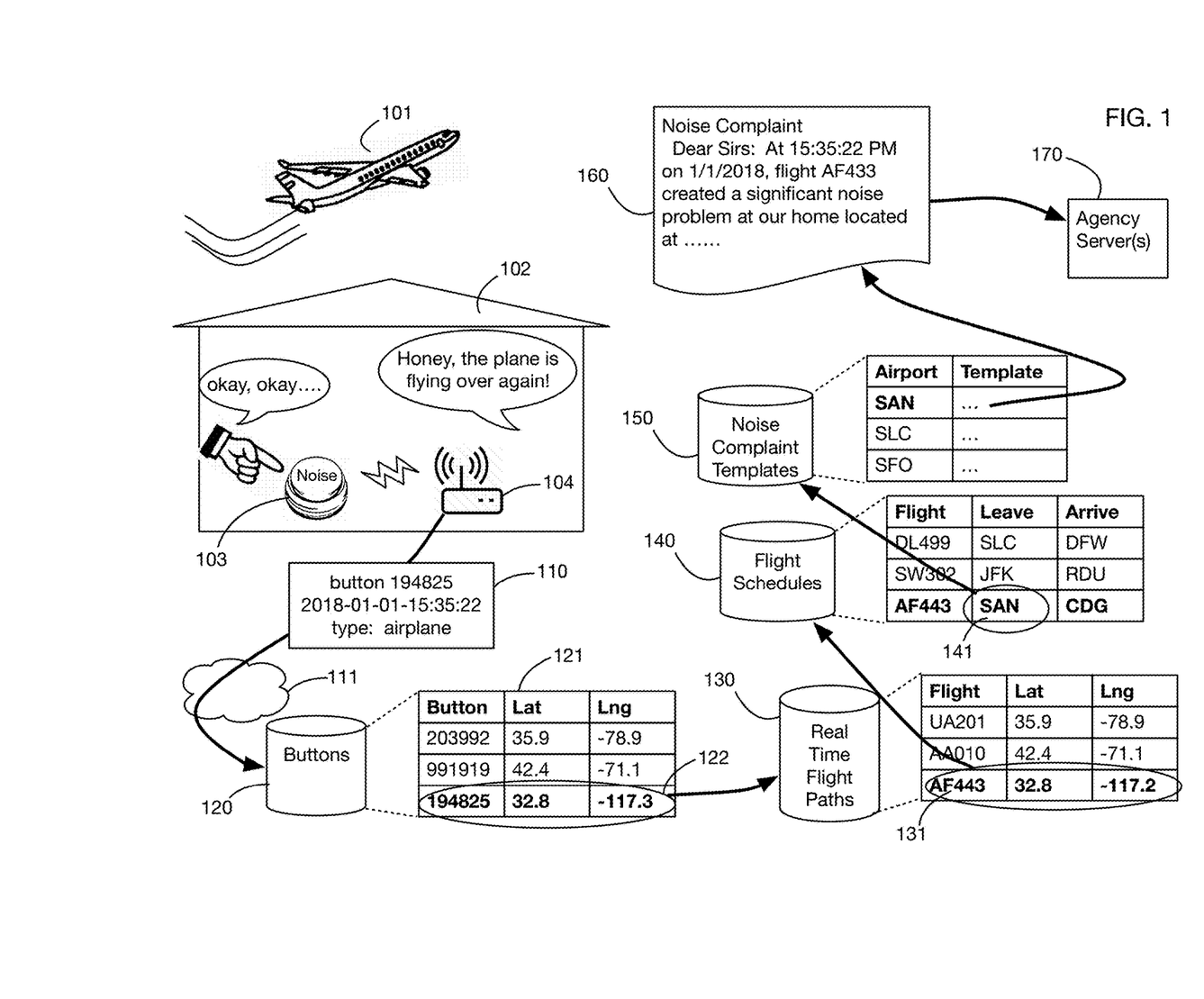
FIG. 1 illustrates an embodiment of the system that generates a complaint for airplane noise when a user clicks a button; the system finds the nearest airplane and the responsible airport, and sends a properly formatted complaint to the airport's server.

FIG. 1 shows for example an embodiment of the invention being used to automatically generate a noise complaint about an airplane using a single click of a button by a user. A user may for example use an input device with an input control such as button 103 to generate a noise complaint when an airplane 101 flies in the vicinity of the user's house 102. Airplane 101 may be any source of noise, including for example a plane, a helicopter, a drone, a missile, a rocket, a spacecraft, or any similar device. In one or more embodiments the input device 103 may have multiple buttons or other input controls, for example for different types of noise.

Button 103 may for example be a hardware input device that may be a WiFi-enabled Internet of Things (IoT) button. The button may have any desired set of input controls. In one or more embodiments, button 103 may be for example a cell phone, a mobile phone, a smartphone, a smart watch, smart glasses, a tablet, a notebook, a laptop, a desktop computer, a server, or any other device capable of accepting a user input. When the user presses button 103, the button may send for example a signal over a WiFi connection to a home wireless access point 104, to begin a sequence of messages and tasks to generate a noise complaint. From the access point 104, messages may be transmitted for example over internet connection 111, to access various servers and databases that may be used to identify and characterize the noise source, and to generate and submit a noise complaint.

As an example, one or more embodiments may use Amazon Web Services (AWS™) to process messages. The button 103 may for example be connected over an encrypted TCP/IP connection to the Amazon Web Services (AWS) IoT gateway. Prior to use by an end user, the button may be configured with both a private encryption key and an encryption certificate, as well as a unique AWS IoT gateway endpoint, while the matching public key may be stored in the AWS IoT gateway. This ensures that all communications between the button and the gateway are encrypted and cannot be impersonated, and that only approved devices can connect to the IoT gateway.

The button may also be assigned to a designated end user or users so that any "clicks" received by the IoT endpoint can be associated with that specific user.

In the illustrative process flow shown in FIG. 1, the button transmits message 110 over the secure connection. This message contains an identifier of the button and a timestamp at which the user pressed the button to generate the complaint. In one or more embodiments, the message may contain additional information. For example, in one or more embodiments a user may make different kinds of clicks on the button to signal different types of problems, and message 110 may contain the type of noise problem. For example, a single-click may indicate that the user wants to complain about a commercial jet near them, while a double-click could be used to make a complaint about a helicopter. In one or more embodiments the input device 103 may have multiple buttons or other input controls for different types of noise complaints.

Upon receiving the IoT device's message 110, the AWS IoT gateway may for example call a designated function in AWS Lambda, a serverless, on-demand computing utility. The AWS Lambda function may for example be custom code written in Python that parses the IoT device's message, adds a timestamp to it, and calls to an encrypted web application programmer interface (API) via the HTTPS protocol with the button click message as parameters. This API may be for example hosted as a Ruby on Rails web appliction ("Rails") running on the Heroku™ application hosting provider. The Rails application may be for example connected to a PostgreSQL™ database that stores all of the application data, including user profiles, button configurations and assignments, and other data. Upon receipt of the button message from AWS Lambda, the Rails API looks up the user account associated with the button, for example in database 120, table 121. The user's location (latitude and longitude of the location where the button is assumed to be when it is clicked) is retrieved from the database, along with the user's air traffic search radius and altitude.

Using the retrieved data 122 with the user's location and air traffic search parameters, the Rails API may issue a series of search queries to one or more publicly accessible third-party APIs for querying databases such as database 130 with real time flight data. For example, without limitation, the system may access ADS-B aircraft reports. ADS-B (Automatic Dependent Surveillance-Broadcast) is a digital air data information protocol by which aircraft broadcast their current GPS position, altitude, airspeed, call-sign, and other data over an unencrypted 1090 MHz frequency. These unencrypted ADS-B broadcasts can be received by anyone over the air using a software defined radio (SDR) and widely-available software running on a commodity computer such as a Raspberry Pi. Several organizations offer networks into which ADS-B receivers can pipe the signals they receive to make them available to everyone else on the network. These organizations also offer APIs that one or more embodiments of the invention may use to query the real-time stream of ADS-B data to look for data of interest. For example, one of these providers offers a query capability that allows specifying a center point (latitude and longitude), distance, and altitude to form a cylindrical search volume. Any ADS-B data that depicts an aircraft within that search volume is returned as a result to the query.

The system may for example query this API and collect the returned aircraft data for a period of 30 seconds for each button click for a given user. The system can tailor the ADS-B search to specific categories of aircraft, for example, commercial jets versus helicopters, depending on the type of button click used to initiate the air traffic search. Knowing what category of aircraft the user is searching for, the ADS-B results may be further filtered to look for only aircraft in that category. Assuming a matching aircraft is found, the system searches for the aircraft data report that represents the point of closest approach (POCA) to the user by computing the slant-range distance from the user's latitude/longitude to the aircraft's position and altitude. This POCA, along with other identifying information pulled from the ADS-B query (for example, aircraft tail number and call-sign) may then be used as the basis for the details used to create an aircraft noise complaint.

In the example shown in FIG. 1, the search of database or databases 130 results in identified flight 131. If this detected aircraft is a commercial airline operation, another third-party API (FlightAware, for example) may be queried to retrieve specific information about the scheduled airline flight the aircraft was performing at the time it was detected. For example, the system may search a database such as flight schedule database 140, which may include information such as the flight number, and origin and destination airports. This data may also be added to the details that form the complaint the system will submit.

Once the air traffic search has identified the flight 131 and the relevant airport such as airport 141, the system may next generate a complaint and send it to the appropriate authority. This authority may be for example the airport authority responsible for managing noise complaints for the origin or destination airport near the user that the detected aircraft was departing from or arriving to. The system may take the complaint details and tailor them to the data required by the cognizant airport authority. For example, a search may be made in database 150 to find an appropriate complaint template for the relevant airport, and a complaint in the correct format 160 may be generated for that template. The complaint may include any of the data identified in the searches described above. The complaint 160 may then be automatically submitted to the appropriate airport authority server 170, for example via the airport authority's approved web form, or by sending a detailed email to the airport authority's designated email address. This completes the noise complaint process that was initiated by the press of the IoT button. In one or more embodiments, the entire process from button press to submission of complaint may take less than one minute end-to-end.

In one or more embodiments, the system may also provide an SMS text message-based input mechanism in lieu of the IoT button. Users can text specific messages to a given phone number to initiate the complaint process. In one or more embodiments, the IoT button may be a voice-enabled device, such as for example an Amazon Echo™ or Google Home™ device, that allow users to generate a complaint by verbally stating, for example, "Alexa™, file a commercial airplane noise complaint" or "Hey, Google™, file a helicopter noise complaint."

Figure 1A:
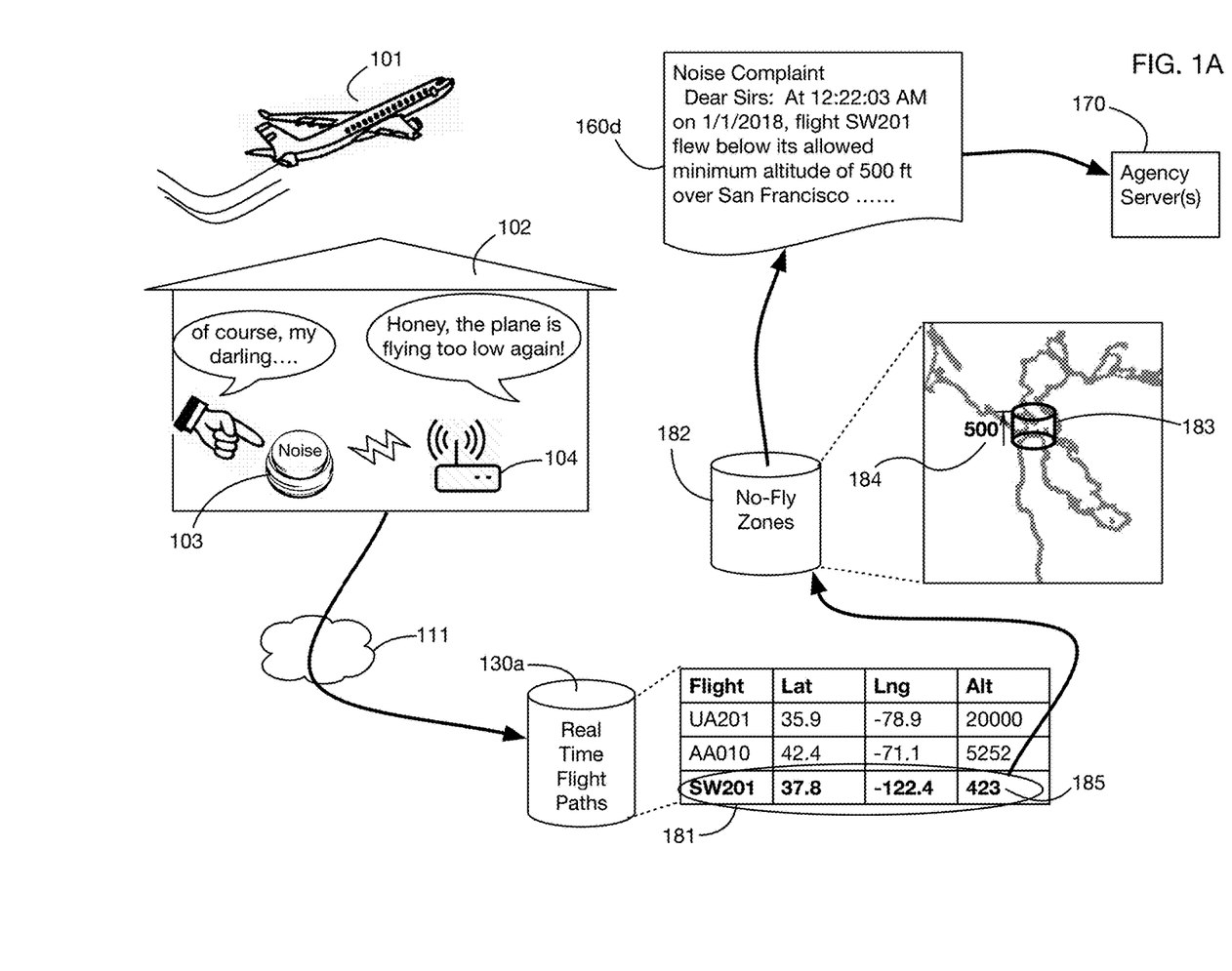
FIG. 1A shows a variation of the example of FIG. 1, where the altitude of the offending flight is compared to an allowable minimum altitude.

In one or more embodiments, the complaint may also indicate that the noise source was performing inappropriately when it generated the noise problem. FIG. 1A shows a variation of the example of FIG. 1, where real time flight path data 130*a* also indicates the altitude of the aircraft at or about the time that the user generated the initial message. In one or more embodiments this altitude may be compared to an allowed altitude for the flight (or for any flights) in the vicinity of the location of the user or the input device. For example, the noise source identification engine may locate the offending flight 181, and then compare the actual altitude of the flight to an allowable minimum altitude. In one or more embodiments the allowable minimum altitude may be part of a database of no-fly zones 182, which may define zones into which a flight should not enter. In one or more embodiments these no-fly zones may be a function of the time, the type of aircraft, or any other factors. In this example a no-fly zone 183 is established around a city, shown as a cylindrical volume for ease of illustration. This no-fly zone 183 has a height 184, which represents a minimum allowable altitude for a flight flying over this city. Since the actual altitude 185 is below this minimum 184, the system may generate a complaint 160*d* that reports that the aircraft has violated this restriction. In one or more embodiments any violation of restrictions such as no-fly areas, no-fly times, minimum altitudes, or other restrictions may be reported along with a noise complaint.

Figure 2:
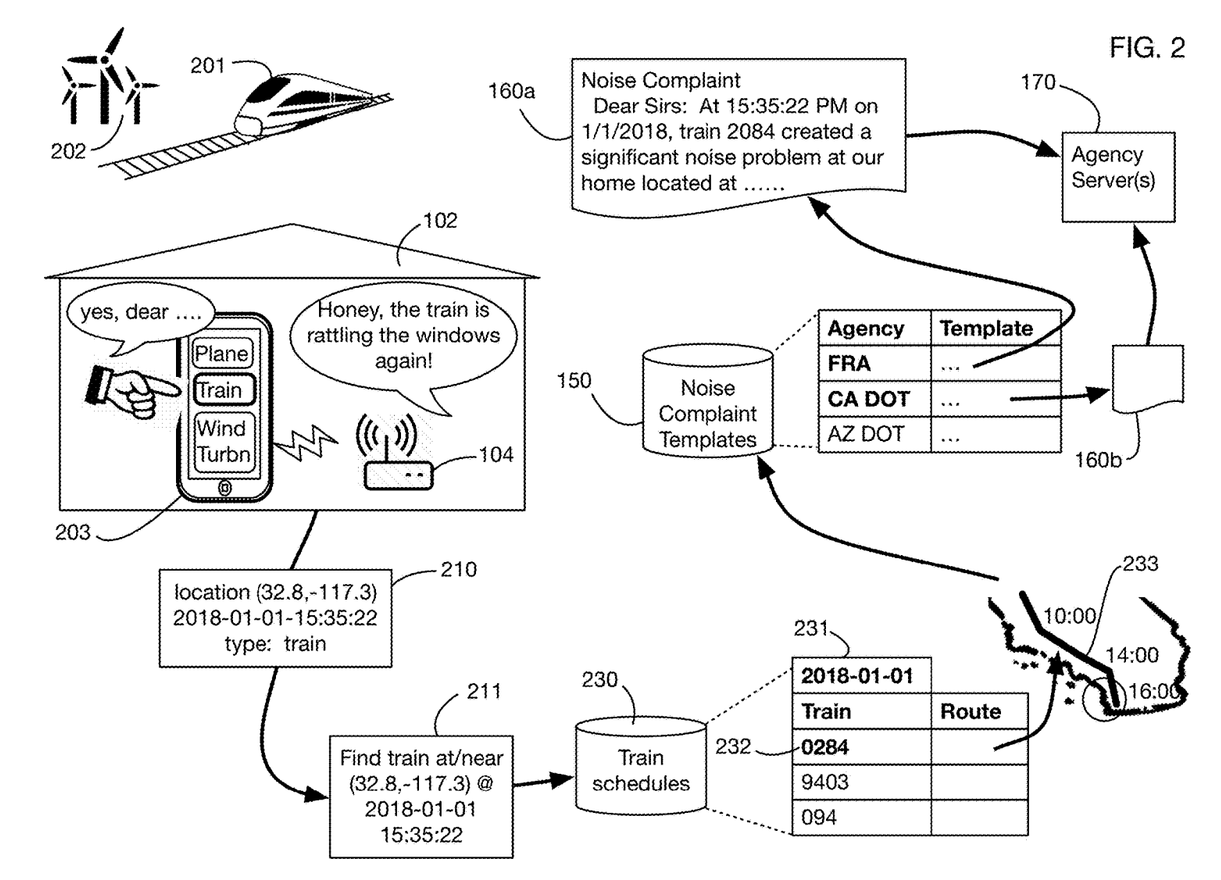

FIG. 2 illustrates an embodiment of the invention that supports generation of noise complaints from various noise sources, in particular from train noise. In this embodiment, a user uses input device 203 to initiate a compliant; device 203 may be for example a mobile phone or tablet. Input device 203 has a screen on which various input controls may be displayed, for example for different types of noise. The illustrated input controls correspond to airplane noise (as described for example with respect to FIG. 1), train noise from a train 201, and wind turbine noise from a wind farm 202. These noise sources are illustrative; one or more embodiments may enable a user to generate a noise complaint for any type or types of undesirable noise. For example, without limitation, types of undesirable noise may include airplane noise, helicopter noise, drone noise, wind turbine noise, ambulance noise, fire engine noise, police siren noise, train noise, and roadway noise. Each noise source may have a corresponding input control in input device 203. In one or more embodiments a single input control may be used to accept user input that identifies a type of noise; for example, a user may type in or speak the type of noise that he or she wishes to complain about. In this example the user presses the input control for a train noise, which generates a message 210 with the time of the event and the type of noise. Message 210 also contains the location of device 203, obtained for example from a GPS on the device; in one or more embodiments the location may be obtained from a stored record or database, as described for example with respect to FIG. 1.

The noise source identification engine receives message 210 and proceeds to search 211 to locate the train that is near the input device 203 at the time of the event. This search may for example access a train schedules database 230, which may for example contain routes 231 for trains on the date of the event. By analyzing the routes such as route 233, the noise source identification engine can identify that train 232 is scheduled to be near the location in message 210 at the date and time that the user initiated the complaint. In one or more embodiments the noise source identification engine may access real-time location information for trains or other vehicles, instead of or in addition to accessing scheduled route information.

Once the noise source 232 is identified, the responsible authority identification engine determines which authority or authorities should receive the complaint. In this example, there are two agencies that may be responsible, one state and one federal, so two complaints 160*a* and 160*b* are generated and are transmitted to the agencies. In one or more embodiments, any number of responsible authorities may receive a complaint as a result of a user initiating the complaint process. Each complaint may be formatted according to the specific complaint template for that authority in database 150.

Figure 3:
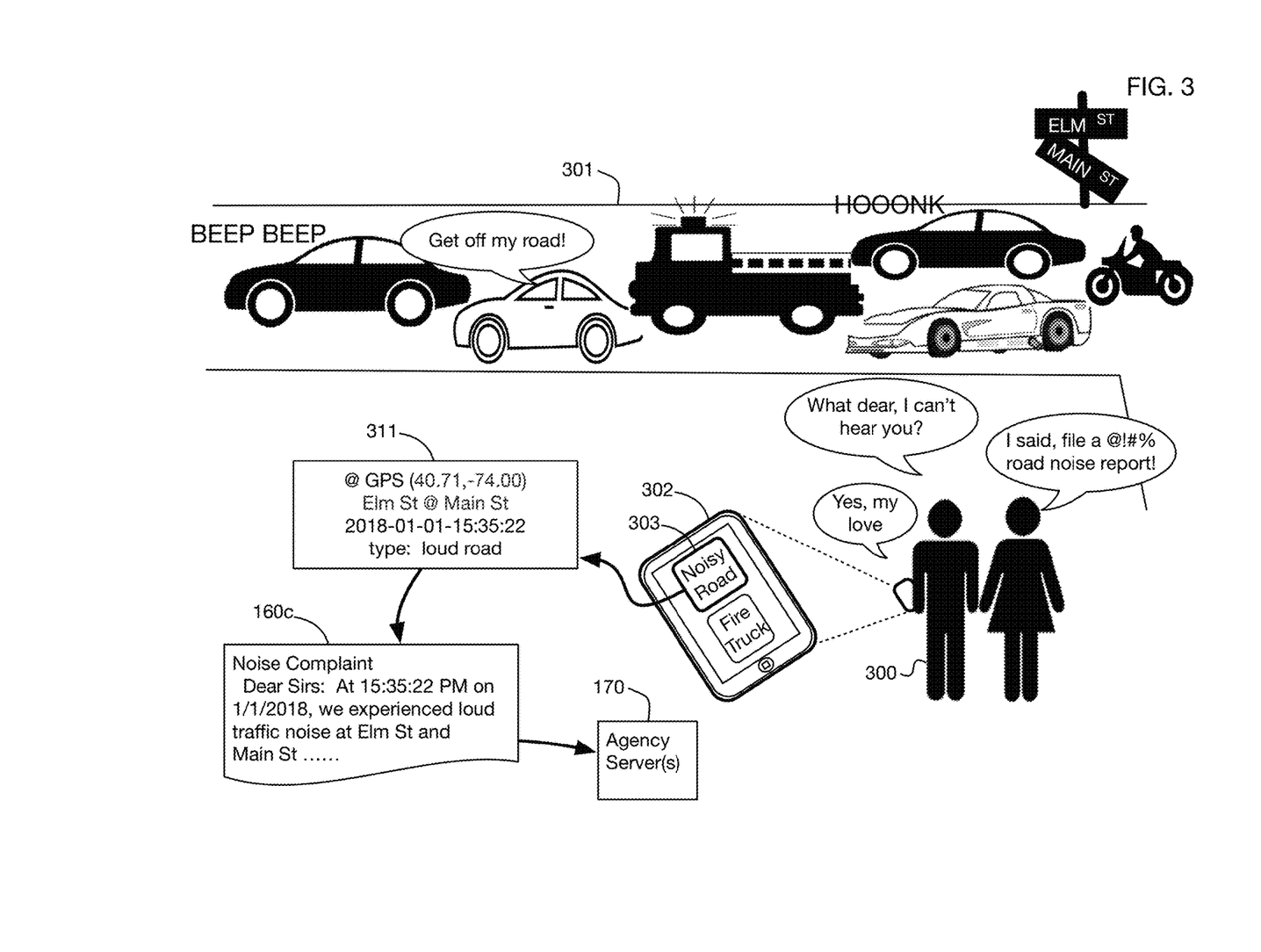
FIG. 3 illustrates an embodiment of the system that generates a complaint for road traffic noise.

FIG. 3 shows an illustrative embodiment that enables a user to file a complaint for undesirable noise from a roadway. In this example, user 300 is near road 301 and wants to initiate a complaint that the roadway traffic noise is at an excessive level. The user has input device 302, such as a mobile phone, with an input control 303 for a noisy road. As in the previous examples, when the user activates this input control 303, a message 311 is generated, which is processed to create a complaint 160*c*. In this example, the GPS of the user's device 302 is translated by the noise source identification engine into a street intersection identification. In one or more embodiments a location may be translated into any format that is useful to the receiving authority, such as for example a street address, a street name, a road name, an intersection name, or a highway name.

Figure 5:
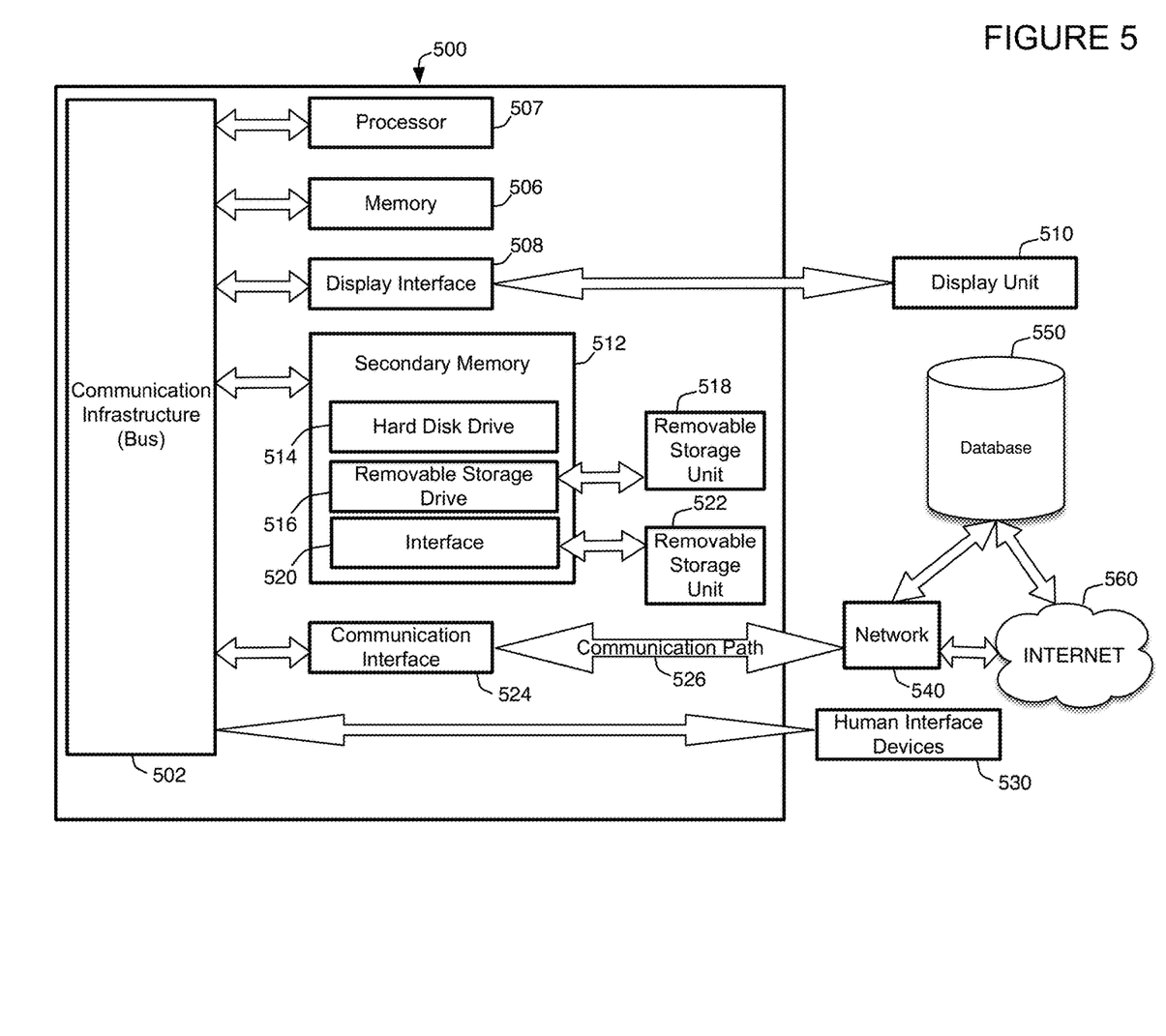
FIG. 5 shows an illustrative computer that may be included in or used by any or all of the system components of one or more embodiments, including for example the components shown in FIG. 4.

FIG. 5 shows an embodiment of exemplary computer 500 that may be utilized in or by any component in the system, e.g., as part of button 103, wireless device 104, coupled with any database 120, 130, 130a, 140, 150, 182, 230, 410, mobile device 203, 302, 401, any engine 404, 406, 408, server 170 etc., i.e., as a computer controller for a database, whether internal as shown or external to the database, all of which require a computer such as 500 to operate and as shown in FIGS. 1, 1A, 2-4. Computer 500 or any other programmable computer or any network of computers may also be utilized to implement any function in the system, i.e., any step or act or function that executes in any computer or server or engine in the system. Computer 500 includes processor 507 that executes software instructions specifically tailored to the respective functions of embodiments of the invention. The software instructions, otherwise known as computer program instructions reside within memory 506. Display interface 508 drives display 510 of any computer in the system as desired. Some computers 500 may or may not utilize a display. Communication interface 524 may include wireless or wired communications hardware protocol chips. In one or more embodiments of the invention communication interface 524 may include telephonic and/or data communications hardware. In one or more embodiments communication interface 524 may include a Wi-Fi™ and/or BLUETOOTH™ wireless communications interface. Bluetooth class 1 devices have a range of approximately 100 meters; class 2 devices have a range of approximately 10 meters. Any wireless network protocol or type may be utilized in embodiments of the invention. Processor 507, memory 506, display interface 508, communication interface 524, human interface devices 530, secondary memory 512, such as hard disk 514, removable storage 516, secondary memory interface 520 and removable storage units 518 and 522 may communicate with one another over communication infrastructure 502, which is commonly known as a "bus". Communications path 526 may include wired or wireless medium that allows for communication with other wired or wireless devices over network 540. Network 540 may communicate with Internet 560 and/or database 550. Database 550 may be utilized to implement any database described herein.

While the invention herein disclosed has been described by means of specific embodiments and applications thereof, numerous modifications and variations could be made thereto by those skilled in the art without departing from the scope of the invention set forth in the claims.

All claims herein only invoke 35 U.S.C. 112(f) when "means for" terminology is used, otherwise all claims herein recite the structure, material or acts that perform a function so claimed.

What is claimed is:

1. A noise complaint reporting system comprising:
an input device configured to
present one or more input controls to a user, each input control of said one or more input controls corresponding to a type of undesirable noise that said user may experience and that said user may wish to report;
when said user activates said each input control, generate a message comprising
a date and time that said user activates said each input control;
the type of undesirable noise corresponding to said each input control; and
a location of said input device when said user activates said each input control;
wherein said input device comprises a button; and
wherein said message is a wireless message;
at least one processor coupled to said input device,
wherein when said user activates said button, said button generates said wireless message to said at least one processor, and
wherein said at least one processor is configured to
receive said wireless message;
correlate one or more of said location of said input device and said date and time that said user activates said each input control with one or more databases to identify a source of said undesirable noise;
identify an authority from one or more authorities responsible for monitoring or responding to noise from said source;
access a template from one or more complaint templates from said one or more databases, wherein each of said one or more complaint templates is specific to and associated with
said one or more authorities or
said type of undesirable noise or
both said one or more authorities and said type of undesirable noise;
generate a complaint in a required complaint format for said template associated with said authority, said complaint comprising
an identity of said user;
said location of said input device;
said date and time; and
said source; and,
transmit said complaint to said authority.

2. The system of claim 1, wherein said button comprises one or more physical buttons or physical switches.

3. The system of claim 1, wherein
said input device further comprises a microphone; and,
said one or more input controls comprise voice commands.

4. The system of claim 1, wherein
said input device further comprises or is coupled to a GPS;
said input device is configured to obtain said location of said input device from said GPS.

5. The system of claim 1, further comprising
a device location database comprising a record that comprises said location of said input device;
wherein one or both of said input device and said at least one processor are configured to obtain said location of said input device from said device location database.

6. The system of claim 1, wherein
said type of undesirable noise corresponding to at least one input control of said one or more input controls comprises noise from an aircraft;
said at least one processor is further configured to search a database of aircraft flight path information to identify said source of said undesirable noise as an aircraft in the proximity of said location of said input device at said date and time.

7. The system of claim 6, wherein
said one or more input controls comprise
a first input control corresponding to undesirable noise from an airplane; and
a second input control corresponding to undesirable noise from a helicopter.

8. The system of claim 6, wherein
said at least one processor is further configured to
obtain an altitude of said aircraft at said date and time; and compare said altitude to an allowed minimum altitude for said aircraft at or near said location of said input device; and, when said altitude of said aircraft at said date and time is below said allowed minimum altitude for said aircraft at or near said location of said input device, generate said complaint further comprising said altitude of said aircraft at said date and time; and, said minimum altitude for said aircraft at or near said location of said input device.

9. The system of claim 1, wherein
said one or more input controls comprise an input control corresponding to undesirable noise from a train.

10. The system of claim 1, wherein
said one or more input controls comprise an input control corresponding to undesirable noise from one or more wind turbines.

11. The system of claim 1, wherein
said one or more input controls comprise an input control corresponding to undesirable noise from road traffic;
said input device comprises a mobile device that comprises or is coupled to a GPS;
said location of said input device comprises a location obtained from said GPS; and,
said correlate one or more of said location of said input device and said date and time that said user activates said each input control with one or more databases to identify a source of said undesirable noise comprises
identify one or more of an address, a street, a road, a highway, or an intersection corresponding to said location obtained from said GPS.

12. The system of claim 1, wherein said input device is coupled to said at least one processor via a network connection comprising
a local WiFi connection coupling said input device to a wireless access point; and,
an Internet connection coupling said wireless access point to an Internet server that hosts or executes all or part of said at least one processor.

13. A noise complaint reporting system comprising:
an input device comprising an input control that corresponds to an undesirable noise from an aircraft that said user may experience and that said user may wish to report, wherein
when said user activates said input control, said input device is configured to
generate a message comprising
a date and time that said user activates said input control; and,
a location of said input device when said user activates said input control;
wherein said input device comprises a button; and
wherein said message is a wireless message;
at least one processor coupled to said input device,
wherein when said user activates said button, said button generates said wireless message to said at least one processor, and
wherein said at least one processor is configured to
receive said wireless message;
search a database of aircraft flight path information to identify a source of said undesirable noise as an aircraft in the proximity of said location of said input device at said date and time;
wherein
all or part of said at least one processor executes on an Internet server; and
said input device is coupled to said at least one processor via a network connection comprising
a local WiFi connection coupling said input device to a wireless access point; and
an Internet connection coupling said wireless access point to said Internet server;
identify an authority from one or more authorities responsible for monitoring or responding to noise from said source;
access a template from one or more complaint templates from said one or more databases, wherein each of said one or more complaint templates is specific to and associated with
said one or more authorities or
said type of undesirable noise or
both said one or more authorities and said type of undesirable noise;
generate a complaint in a required complaint format for said template associated with said authority, said complaint comprising
an identity of said user;
said location of said input device;
said date and time; and
said source; and,
transmit said complaint to said authority.

14. The system of claim 13, wherein said at least one processor is further configured to identify said authority responsible for monitoring or responding to noise from said source as a departure airport or an arrival airport of said aircraft.

15. The system of claim 1, wherein said button is connected over an encrypted TCP/IP connection to an Internet of Things (IoT) gateway.

16. The system of claim 1, wherein said button comprises a plurality of buttons that correspond to a plurality different types of undesirable noise.

* * * * *